US012113174B2

(12) United States Patent
Furuya et al.

(10) Patent No.: US 12,113,174 B2
(45) Date of Patent: Oct. 8, 2024

(54) METHOD FOR MANUFACTURING LITHIUM-ION CELL AND LITHIUM-ION CELL

(71) Applicant: ELIIY Power Co., Ltd., Tokyo (JP)

(72) Inventors: Ryota Furuya, Tokyo (JP); Tomitaro Hara, Tokyo (JP)

(73) Assignee: ELIIY POWER CO., LTD, Tokyo (JP)

( * ) Notice: Subject to any disclaimer, the term of this patent is extended or adjusted under 35 U.S.C. 154(b) by 772 days.

(21) Appl. No.: 17/282,148

(22) PCT Filed: Oct. 1, 2019

(86) PCT No.: PCT/JP2019/038777
§ 371 (c)(1),
(2) Date: Apr. 1, 2021

(87) PCT Pub. No.: WO2020/071377
PCT Pub. Date: Apr. 9, 2020

(65) Prior Publication Data
US 2021/0359344 A1    Nov. 18, 2021

(30) Foreign Application Priority Data
Oct. 2, 2018 (JP) ................................ 2018-187523

(51) Int. Cl.
*H01M 10/0568* (2010.01)
*H01M 4/04* (2006.01)
(Continued)

(52) U.S. Cl.
CPC ..... *H01M 10/0568* (2013.01); *H01M 4/0416* (2013.01); *H01M 10/0525* (2013.01);
(Continued)

(58) Field of Classification Search
CPC ......... H01M 10/0568; H01M 10/0569; H01M 4/0416
(Continued)

(56) References Cited

U.S. PATENT DOCUMENTS

2011/0171503 A1* 7/2011 Giroud ................ H01M 50/103
429/50
2012/0018077 A1* 1/2012 Lee ....................... H01G 9/2009
252/62.2
(Continued)

FOREIGN PATENT DOCUMENTS

JP    2008257963 A    10/2008
JP    2015-011823 A    1/2015
(Continued)

OTHER PUBLICATIONS

Pyschik et al. Thermal Aging of Anions in Ionic Liquids containing Lithium Salts. Electrochimica Acta 130, 2014, pp. 426-430 [online]. Retrieved from <URL: https://www.sciencedirect.com/science/article/pii/S0013468614005313> (Year: 2014).*
(Continued)

*Primary Examiner* — James M Erwin
(74) *Attorney, Agent, or Firm* — Stites & Harbison, PLLC; Jeffrey A. Haeberlin; Trevor T. Graves (57) ABSTRACT

A method of the present invention for manufacturing a lithium-ion cell comprises the step of impregnating a porous positive-electrode active material layer or a porous negative-electrode active material layer with an ionic liquid electrolyte. The ionic liquid electrolyte includes: an ionic liquid comprising an anion and a cation; and a lithium salt dissolved in the ionic liquid. The anion is bis(fluorosulfonyl)imide ion. The lithium salt is lithium bis(fluorosulfonyl)imide or lithium bis(trifluoromethansulfonyl)imide. The ionic liquid electrolyte contains the lithium salt at a concentration of 1.6 mol/L to 3.2 mol/L inclusive. The step of
(Continued)

impregnation with the ionic liquid electrolyte is the step of impregnating the positive-electrode active material layer or the negative-electrode active material layer with the ionic liquid electrolyte at a temperature of 50° C. to 100° C. inclusive.

20 Claims, 7 Drawing Sheets

(51) Int. Cl.
    *H01M 10/0525*     (2010.01)
    *H01M 10/0569*     (2010.01)
    *H01M 4/02*     (2006.01)

(52) U.S. Cl.
    CPC .. *H01M 10/0569* (2013.01); *H01M 2004/021* (2013.01); *H01M 2300/0025* (2013.01)

(58) Field of Classification Search
    USPC ......................................................... 429/199
    See application file for complete search history.

(56) References Cited

U.S. PATENT DOCUMENTS

| | | | | |
|---|---|---|---|---|
| 2014/0162094 A1* | 6/2014 | Nishino | .............. | B05B 17/0646 |
| | | | | 361/502 |
| 2016/0149224 A1 | 5/2016 | Okuno et al. | | |
| 2016/0268064 A1 | 9/2016 | Ishikawa et al. | | |
| 2017/0098823 A1* | 4/2017 | Yushin | ................... | H01M 4/582 |
| 2017/0346137 A1* | 11/2017 | Chang | ............... | H01M 10/0567 |
| 2018/0090792 A1* | 3/2018 | Kawasaki | ............. | H01M 4/525 |
| 2018/0102543 A1* | 4/2018 | Su | ....................... | H01M 4/0471 |
| 2018/0233780 A1 | 8/2018 | Ishikawa et al. | | |

FOREIGN PATENT DOCUMENTS

| | | | | |
|---|---|---|---|---|
| JP | 2015-198023 A | 11/2015 | | |
| JP | 2016207641 A | 12/2016 | | |
| JP | 2017-195129 A | 10/2017 | | |
| JP | 2018-116840 A | 7/2018 | | |
| WO | 2013/063367 A1 | 5/2013 | | |
| WO | WO-2018230238 A1 * | 12/2018 | ........ | H01M 10/0567 |

OTHER PUBLICATIONS

European Patent Office, Extended European Search Report issued in corresponding Application No. EP 19869896, dated Jul. 12, 2022.

Japan Patent Office, International Search Report issued in corresponding Application No. PCT/JP2019/038777, mailed Dec. 17, 2019.

* cited by examiner

METHOD FOR MANUFACTURING LITHIUM-ION CELL AND LITHIUM-ION CELL

TECHNICAL FIELD

The present invention relates to a method for manufacturing a lithium-ion cell and a lithium-ion cell.

BACKGROUND ART

Due to their high energy density, lithium-ion cells are widely installed in electronic and electrical devices such as smartphones and laptop computers. In the lithium-ion cells, a flammable non-aqueous electrolytic solution in which, in general, a lithium salt is dispersed in a non-aqueous solvent is used as an electrolytic solution. In addition, the lithium-ion cells may generate heat due to overcharging or short-circuiting between a positive electrode and a negative electrode. Furthermore, a positive-electrode active material may release oxygen in a crystal due to thermal decomposition or overcharging. As a result, the lithium-ion cells may generate abnormal heat or ignite.

In order to prevent accidents due to this abnormal heat generation or the ignition, it has been proposed to use an ionic liquid as the electrolyte solvent in the lithium-ion cells (see, for example, PTL 1 and PTL 2). The ionic liquid comprises an anion and a cation, and is generally low in vapor pressure and nonflammable. Therefore, the use of the ionic liquid as the electrolyte solvent can improve safety of the lithium-ion cells.

CITATION LIST

Patent Literature

PTL 1: Japanese Unexamined Patent Application Publication No. 2017-195129
PTL 2: Japanese Unexamined Patent Application Publication No. 2018-116840

SUMMARY OF INVENTION

Technical Problem

Ionic liquids are higher in viscosity than organic solvents. In a traditional lithium-ion cell using an ionic liquid electrolyte, the transfer resistance of the ionic liquid electrolyte when the ionic liquid electrolyte transfers through fine pores of a positive-electrode active material layer and fine pores of a negative-electrode active material layer becomes high; and it makes it difficult to thoroughly and completely fill the positive-electrode active material layer and the negative-electrode active material layer with the ionic liquid electrolyte. If there are some fine pores that are not filled with the ionic liquid electrolyte in the active material layers, a reactive area of a positive electrode or a negative electrode becomes narrow; and the lithium-ion cell becomes low in charge-discharge characteristics. Also, the lithium-ion cell using the ionic liquid electrolyte may possibly become low in cycle characteristics.

The present invention was devised in view of such circumstances, and provides a method capable of manufacturing a lithium-ion cell having excellent charge-discharge characteristics and cycle characteristics.

Solution to Problem

The present invention provides a method for manufacturing a lithium-ion cell, the method comprising the step of impregnating a porous positive-electrode active material layer or a porous negative-electrode active material layer with an ionic liquid electrolyte, wherein the ionic liquid electrolyte includes: an ionic liquid comprising an anion and a cation; and a lithium salt dissolved in the ionic liquid;
the anion is bis(fluorosulfonyl)imide ion;
the lithium salt is lithium bis(fluorosulfonyl)imide or lithium bis(trifluoromethansulfonyl)imide;
the ionic liquid electrolyte contains the lithium salt at a concentration of 1.6 mol/L to 3.2 mol/L inclusive; and
the step of impregnation with the ionic liquid electrolyte is the step of impregnating the positive-electrode active material layer or the negative-electrode active material layer with the ionic liquid electrolyte at a temperature of 50° C. to 100° C. inclusive.

Advantageous Effects of Invention

The anion in the ionic liquid contained in the ionic liquid electrolyte to be used for the manufacturing method of the present invention is bis(fluorosulfonyl)imide ion. This allows the ionic liquid electrolyte to have low viscosity, and enables the porous positive-electrode active material layer or the porous negative-electrode active material layer to be thoroughly and totally impregnated with the ionic liquid electrolyte.

The lithium salt dissolved in the ionic liquid is lithium bis(fluorosulfonyl)imide or lithium bis(trifluoromethansulfonyl)imide. Because both the lithium salt and the ionic liquid have the imide anion, it makes it possible to increase a lithium salt concentration in the ionic liquid electrolyte; and this makes it possible for the ionic liquid electrolyte to have high ionic conductivity. As a result, the lithium-ion cell can have excellent charge-discharge characteristics.

The step of impregnation with the ionic liquid electrolyte is the step of impregnating the porous positive-electrode active material layer or the porous negative-electrode active material layer with the ionic liquid electrolyte at a temperature of 50° C. or higher to 100° C. or lower. The higher the temperature is, the lower the viscosity of the ionic liquid; therefore, the ionic liquid set at the temperature of 50° C. or higher makes it possible to decrease the viscosity of the ionic liquid electrolyte, with the result that the transfer resistance of the ionic liquid electrolyte when the ionic liquid electrolyte enters fine pores of the positive-electrode active material layer or fine pores of the negative-electrode active material layer can be reduced. By impregnating the porous positive-electrode active material layer or the porous negative-electrode active material layer with this low-viscosity ionic liquid electrolyte, most of the fine pores of the positive-electrode active material layer or the negative-electrode active material layer can be filled with the ionic liquid electrolyte. This makes it possible to widen surface areas of the electrodes where an electrode reaction between the positive-electrode active material or the negative-electrode active material and the ionic liquid electrolyte occurs, leading to improvement in the charge-discharge characteristics of the lithium-ion cell.

The ionic liquid electrolyte contains the lithium salt at a concentration of 1.6 mol/L to 3.2 mol/L inclusive. This allows the lithium-ion cell to have the excellent charge-discharge characteristics and cycle characteristics. This became clear from experiments carried out by the inventors of the present application. It was observed in the experiments that the cells using the ionic liquid electrolyte having the lithium salt concentration of 0.8 mol/L were low in the cycle characteristics. Therefore, it is thought that the lithium salt concentration of 1.6 mol/L or higher may be capable of preventing the ionic liquid electrolyte from denaturing, and of improving the cycle characteristics.

DESCRIPTION OF EMBODIMENTS

A method of the present invention for manufacturing a lithium-ion cell is characterized by comprising the step of impregnating a porous positive-electrode active material layer or a porous negative-electrode active material layer with an ionic liquid electrolyte, wherein the ionic liquid electrolyte includes: an ionic liquid comprising an anion and a cation; and a lithium salt dissolved in the ionic liquid;
the anion is bis(fluorosulfonyl)imide ion;
the lithium salt is lithium bis(fluorosulfonyl)imide or lithium bis(trifluoromethansulfonyl)imide;
the ionic liquid electrolyte contains the lithium salt at a concentration of 1.6 mol/L to 3.2 mol/L inclusive; and
the step of impregnation with the ionic liquid electrolyte is the step of impregnating the positive-electrode active material layer or the negative-electrode active material layer with the ionic liquid electrolyte at a temperature of 50° C. to 100° C. inclusive.

It is desirable that the step of impregnation with the ionic liquid electrolyte included in the manufacturing method of the present invention should be the step of impregnating the positive-electrode active material layer or the negative-electrode active material layer with the ionic liquid electrolyte having a viscosity of 50 mPa·s or less. It is desirable that the step of impregnation with the ionic liquid electrolyte should be carried out under reduced pressure. This allows the positive-electrode active material layer or the negative-electrode active material layer to be thoroughly and completely impregnated with the ionic liquid electrolyte.

It is desirable that the cation in the ionic liquid contained in the ionic liquid electrolyte should be pyrrolidinium-based ion or imidazolium-based ion. It is desirable that this cation should be methylpropyl pyrrolidinium ion or ethylmethyl imidazolium ion. This makes it possible to reduce the viscosity of the ionic liquid electrolyte.

It is desirable that a logarithm differential pore volume distribution curve should have a peak within a range of 0.6 μm or less of the pore diameter, the distribution curve showing the relationship between a pore diameter and a pore volume of the fine pores in the positive-electrode active material layer or in the negative-electrode active material layer. This makes it possible to widen a positive-electrode surface where a positive-electrode reaction occurs or a negative-electrode surface where a negative-electrode reaction occurs, thereby enabling the lithium-ion cell to improve in charge-discharge characteristics.

It is desirable that the step of impregnation with the ionic liquid electrolyte included in the manufacturing method of the present invention should be carried out in a state where an electrode assembly is placed in a cell housing, the electrode assembly comprising: a positive electrode including the positive-electrode active material layer; a negative electrode including the negative-electrode active material layer; and a separator. This makes it possible to simultaneously impregnate the positive-electrode active material layer and the negative-electrode active material layer with the ionic liquid electrolyte.

The present invention also provides a lithium-ion cell comprising: an electrode assembly; an ionic liquid electrolyte; and a cell housing accommodating the electrode assembly and the ionic liquid electrolyte. This lithium-ion cell has the following features:

the electrode assembly comprises: a positive electrode including a porous positive-electrode active material layer; a negative electrode including a porous negative-electrode active material layer; and a separator;
the ionic liquid electrolyte contains: an ionic liquid including an anion and a cation; and a lithium salt dissolved in the ionic liquid;
the anion is bis(fluorosulfonyl)imide ion;
the lithium salt is lithium bis(fluorosulfonyl)imide or lithium bis(trifluoromethansulfonyl)imide; and
the ionic liquid electrolyte contains the lithium salt at a concentration of 1.6 mol/L to 3.2 mol/L inclusive.

It is desirable that the positive-electrode active material layer or the negative-electrode active material layer contained in the lithium-ion cell in accordance with the present Embodiment should have fine pores whose diameter is 0.6 μm or less, and that the fine pores are filled with the ionic liquid electrolyte. This enables the lithium-ion cell to have excellent charge-discharge characteristics.

It is desirable that the cation in the ionic liquid included in the lithium-ion cell in accordance with the present Embodiment should be methylpropyl pyrrolidinium ion or ethylmethyl imidazolium ion.

It is desirable that the positive-electrode active material layer or the negative-electrode active material layer included in the lithium-ion cell in accordance with the present Embodiment should be 35 μm to 200 μm, inclusive, in thickness. This makes it possible for the positive-electrode active material layer or the negative-electrode active material layer to be thoroughly and totally impregnated with the ionic liquid electrolyte.

Hereinafter, an Embodiment of the present invention will be described with reference to the accompanying drawings. Structures shown in the drawings or described below should be recognized as exemplifications in all respects, and the scope of the present invention is not limited to the drawings and the following descriptions.

Figure 1:
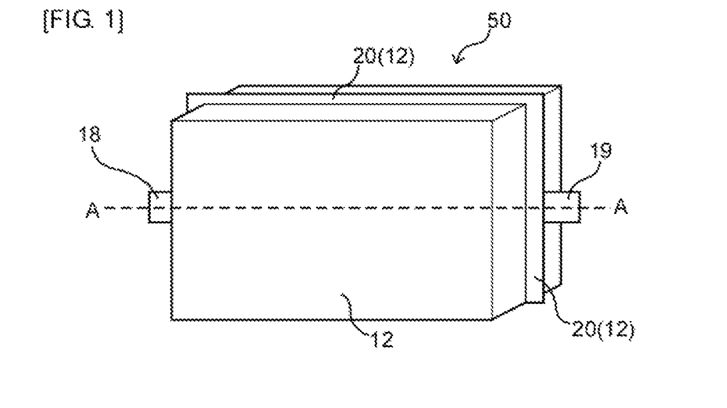
FIG. 1 is a diagrammatic perspective view of a lithium-ion cell in accordance with one Embodiment of the present invention.
Figure 2:
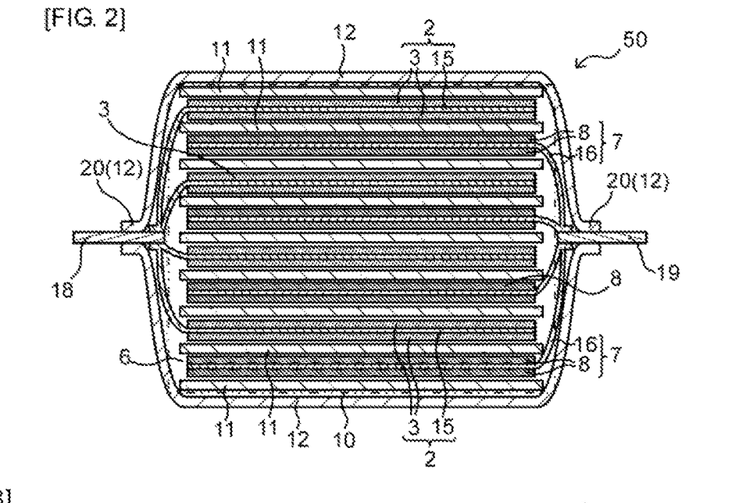
FIG. 2 is a diagrammatic cross-section view of the lithium-ion cell taken along the dashed line A-A of FIG. 1.
Figure 3:
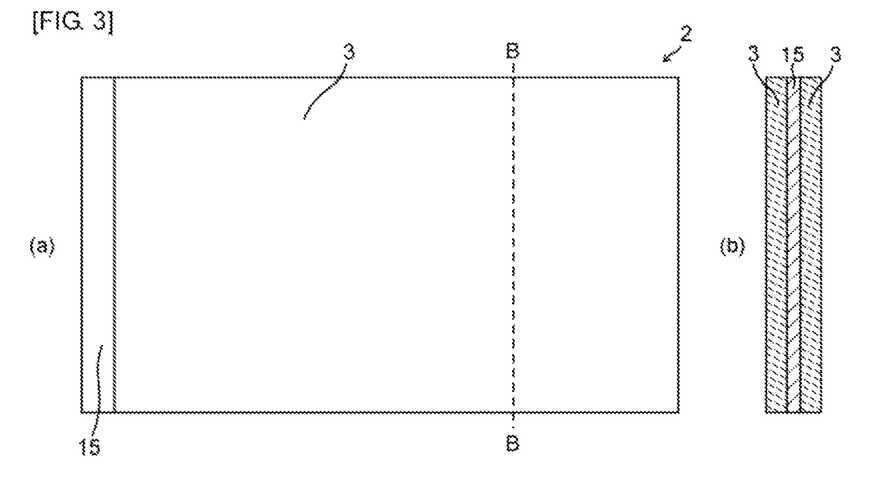
FIG. 3(a) is a diagrammatic plan view of a positive electrode included in a lithium-ion cell in accordance with one Embodiment of the present invention.
FIG. 3(b) is a diagrammatic cross-section view of the positive electrode taken along the dashed line B-B of FIG. 3(a).
Figure 4:
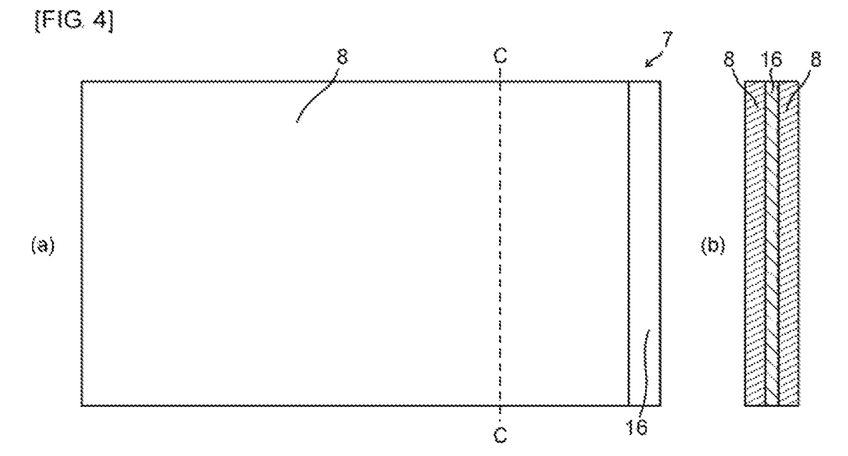
FIG. 4(a) is a diagrammatic plan view of a negative electrode included in a lithium-ion cell in accordance with one Embodiment of the present invention.
FIG. 4(b) is a diagrammatic cross-section view of the negative electrode taken along the dashed line C-C of FIG. 4(a).
Figure 5:
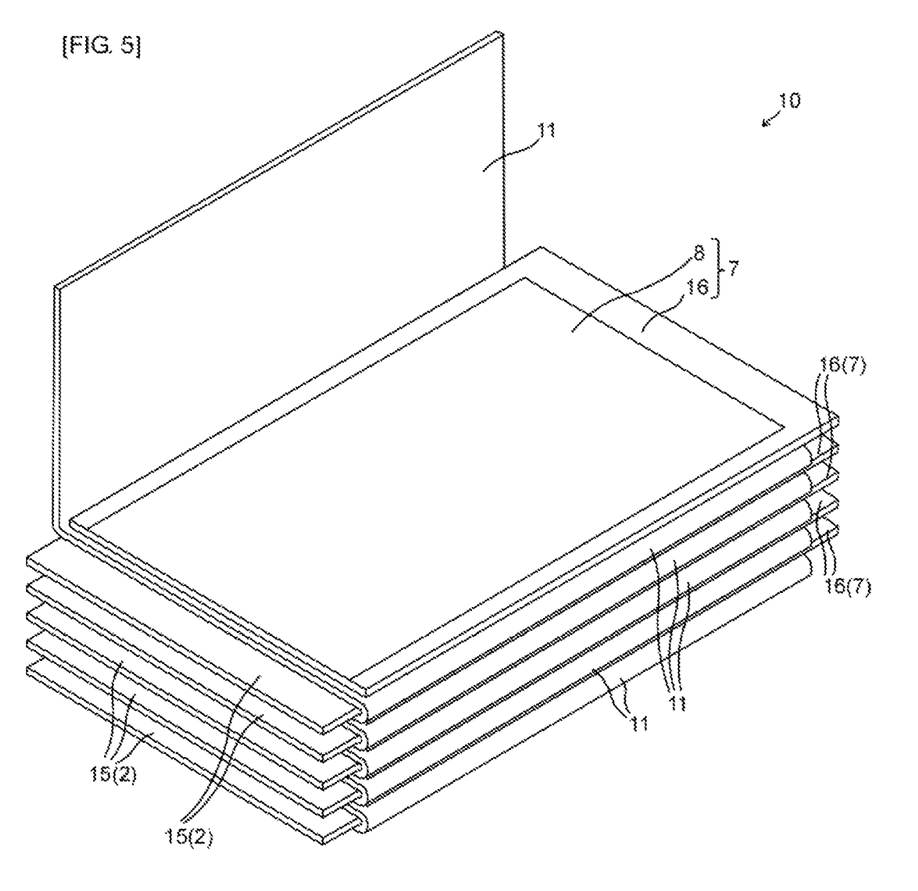
FIG. 5 is a diagrammatic perspective view of an electrode assembly included in a lithium-ion cell in accordance with one Embodiment of the present invention.

FIG. 1 illustrates a diagrammatic perspective view of a lithium-ion cell in accordance with the present Embodiment; and FIG. 2 illustrates a diagrammatic cross-section view of the lithium-ion cell taken along the dashed line A-A of FIG. 1. FIG. 3 illustrates a diagrammatic plan view and a diagrammatic cross-section view of a positive electrode; FIG. 4 illustrates a diagrammatic plan view and a diagrammatic cross-section view of a negative electrode; and FIG. 5 illustrates a diagrammatic perspective view of an electrode assembly. FIGS. 6 to 9 illustrate explanatory diagrams of how a lithium-ion cell in accordance with the present Embodiment is prepared.

A method for manufacturing a lithium-ion cell 50 in accordance with the present embodiment comprises the step of impregnating a porous positive-electrode active material layer 3 or a porous negative-electrode active material layer 8 with an ionic liquid electrolyte 6. The ionic liquid electrolyte 6 contains as follows: an ionic liquid comprising an anion and a cation; and a lithium salt dissolved in the ionic liquid. The anion is bis(fluorosulfonyl)imide ion (FSI). The lithium salt is lithium bis(fluorosulfonyl)imide (LiFSI) or lithium bis(trifluoromethansulfonyl)imide (LiTFSI). The ionic liquid electrolyte 6 contains the lithium salt at a concentration of 1.6 mol/L to 3.2 mol/L inclusive. The step of impregnation with the ionic liquid electrolyte 6 is the step of impregnating the positive-electrode active material layer 3 or the negative-electrode active material layer 8 with the ionic liquid electrolyte 6 at a temperature of 50° C. to 100° C. inclusive.

The lithium-ion cell 50 in accordance with the present Embodiment comprises: an electrode assembly 10; an ionic liquid electrolyte 6; and a cell housing 12 housing the electrode assembly 10 and the ionic liquid electrolyte 6. The electrode assembly 10 includes: a positive electrode 2 comprising the porous positive-electrode active material layer 3; a negative electrode 7 comprising the porous negative-electrode active material layer 8; and a separator 11. The ionic liquid electrolyte 6 contains: an ionic liquid comprising an anion and a cation; and a lithium salt dissolved in the ionic liquid. The anion is bis(fluorosulfonyl)imide ion. The lithium salt is lithium bis(fluorosulfonyl)imide or lithium bis(trifluoromethansulfonyl)imide. The ionic liquid electrolyte 6 contains the lithium salt at the concentration of 1.6 mol/L to 3.2 mol/L inclusive.

The cell housing 12 is an external body that houses the electrode assembly 10 (including the positive electrode 2, the negative electrode 7, and the separator 11) and the ionic liquid electrolyte 6. The cell housing 12 may be in the form of a pouch that is formed by fusing a laminate film at a fusion bonding section 20. In this case, the lithium-ion cell 50 is a pouch cell. The cell housing 12 may also be a metallic case and may be a hard resin case.

The positive electrode 2 has the porous positive-electrode active material layer 3. The positive-electrode active material layer 3 is, for example, a porous layer containing a positive-electrode active material 4 disposed on a film-like positive-electrode current collector 15. The positive electrode 2 may have a structure, as an example, as shown in FIG. 3. The positive-electrode current collector 15 is electrically connected with a positive-electrode terminal 18. The positive-electrode current collector 15 is, for example, an aluminum foil.

The positive electrode active material 4 is a substance directly involved in electron transfer associated with electric charge transfer on the positive electrode 2. Examples of the positive-electrode active material 4 include $LiCoO_2$, $LiNiO_2$, $LiNi_xCo_{1-x}O_2$ (x=0.01 to 0.99), $LiMnO_2$, $LiMn_2O_4$, $LiCo_xMn_yNi_zO_2$ (x+y+z=1), and olivine-type $LiFePO_4$ and $Li_xFe_{1-y}M_yPO_4$ (provided that $0.05 \leq x \leq 1.2$, $0 \leq y \leq 0.8$, M is at least one kind selected from Mn, Cr, Co, Cu, Ni, V, Mo, Ti, Zn, Al, Ga, Mg, B, and Nb). The positive-electrode active material layer 3 may include only one of these positive-electrode active materials or two or more of these active materials. The positive-electrode active material may have a conductive membrane on a surface thereof. This allows for improvement in conductive property of the positive-electrode active material surface where an intercalation reaction occurs, and allows a decrease in internal resistance at the positive electrode 2. The conductive membrane is, for example, a carbon film.

A positive-electrode reaction associated with charge and discharge of the lithium-ion cell 50 mainly occurs at a surface of the positive-electrode active material 4. This can allow the positive-electrode reaction to occur also at surfaces of fine pores 5 of the porous positive-electrode active material layer 3, and thus can allow for improvement of charge-discharge characteristics of the lithium-ion cell 50. To allow the positive-electrode reaction to occur at the internal surfaces of the fine pores 5, the fine pores 5 need to be filled with the ionic liquid electrolyte 6.

The positive-electrode active material layer 3 may be configured in such a way that a logarithm differential pore volume distribution curve, which indicates a relationship between a pore diameter and a pore volume of the fine pores 5 in the positive-electrode active material layer 3, has a peak within a range of 0.6 μm or less of the pore diameter.

The fine pores 5 in the positive-electrode active material layer 3, which are 0.6 μm or less in pore diameter, are filled with the ionic liquid electrolyte 6 so that the positive-electrode active material layer 3 can be impregnated with the ionic liquid electrolyte 6. This can allow the positive-electrode active material layer 3 to have a wide surface area where the positive-electrode reaction occurs, and can allow the lithium-ion cell 50 to improve in charge-discharge characteristics. How to impregnate the positive-electrode active material layer 3 with the ionic liquid electrolyte 6 will be described below.

The positive-electrode active material layer 3 may be 35 μm or more to 200 μm or less in thickness. This enables the positive-electrode active material layer 3 to be thoroughly and totally impregnated with the ionic liquid electrolyte 6, and thus enables throughout most of the fine pores 5 in the positive-electrode active material layer 3 to be filled with the ionic liquid electrolyte 6.

The positive-electrode active material layer 3 may contain a conductive additive. This can allow the positive-electrode active material layer 3 to improve in conductivity, and can allow a decrease in internal resistance at the positive electrode 2. An example of the conductive additive is acetylene black. Also, the conductive additive may be microparticles of coke-type soft carbon, which is graphitizable carbon.

The positive-electrode active material layer 3 may contain a binder. Examples of the binder include polyvinylidene fluoride (PVdF), polytetrafluoroethylene (PTFE), styrene-butadiene copolymer (SBR), carboxymethylcellulose sodium (CMC), acrylonitrile rubber, and a mixture of acrylonitrile rubber and PTFE.

For example, powder of the positive-electrode active material, the conductive additive, and the binder are mixed, preparing a paste; and this paste is applied to the positive-electrode current collector 15. Then, the layer-like paste is dried and pressed, thereby forming the positive-electrode active material layer 3. A solvent used to prepare the paste is, for example, water, dimethylformamide, N-methylpyrrolidone, isopropanol, or toluene.

The negative electrode 7 has the porous negative-electrode active material layer 8. The negative-electrode active material layer 8 is, for example, a porous layer containing a negative-electrode active material disposed on a film-like negative-electrode current collector 16. The negative electrode 7 may have a structure, as an example, as shown in FIG. 4. The negative-electrode current collector 16 is electrically connected with a negative-electrode terminal 19. The negative-electrode current collector 16 is, for example, a copper foil.

The negative-electrode active material is a substance directly involved in electron transfer associated with electric charge transfer on the negative electrode. Examples of the negative-electrode active material include graphite, partially graphitized carbon, hard carbon, soft carbon, lithium titanate (LTO), and an Sn alloy. The negative-electrode active material layer 8 may include only one of these negative-electrode active materials or two or more of these active materials.

A negative-electrode reaction associated with charge and discharge of the lithium-ion cell 50 mainly occurs at a surface of the negative-electrode active material. This can allow the negative-electrode reaction to occur also at surfaces of fine pores of the porous negative-electrode active material layer 8, and thus can allow for improvement of charge-discharge characteristics of the lithium-ion cell 50. To allow the negative-electrode reaction to occur at the surfaces of the fine pores, the fine pores need to be filled with the ionic liquid electrolyte 6.

The negative-electrode active material layer 8 may be configured in such a way that a logarithm differential pore volume distribution curve, which indicates a relationship between a pore diameter and a pore volume of the fine pores in the negative-electrode active material layer 8, has a peak within a range of 10 µm or less of the pore diameter. It is preferable that the negative-electrode active material layer 8 is configured in such a way that the logarithm differential pore volume distribution curve, which indicates the relationship between the pore diameter and the pore volume of the fine pores in the negative-electrode active material layer 8, should have the peak within a range of 1 µm or less, and more preferably the peak within a range of 0.6 µm or less.

The fine pores in the negative-electrode active material layer 8, which are within the above range, are filled with the ionic liquid electrolyte 6 so that the negative-electrode active material layer 8 can be impregnated with the ionic liquid electrolyte 6. This can allow the negative-electrode active material layer 8 to have a wide surface area where the negative-electrode reaction occurs, and can allow the lithium-ion cell 50 to improve in charge-discharge characteristics. How to impregnate the negative-electrode active material layer 8 with the ionic liquid electrolyte 6 will be described below.

The negative-electrode active material layer 8 may be 35 µm or more to 200 µm or less in thickness. This enables the negative-electrode active material layer 8 to be thoroughly and totally impregnated with the ionic liquid electrolyte 6, and thus enables throughout most of the fine pores in the negative-electrode active material layer 8 to be filled with the ionic liquid electrolyte 6.

The negative-electrode active material layer 8 may contain a binder. Examples of the binder include polyvinylidene fluoride (PVdF), polytetrafluoroethylene (PTFE), styrene-butadiene copolymer (SBR), carboxymethylcellulose sodium (CMC), acrylonitrile rubber, and a mixture of acrylonitrile rubber and PTFE.

The negative-electrode active material layer 8 may contain an additive, such as a thickener, as needed.

For example, powder of the negative-electrode active material and the binder are mixed, preparing a paste; and this paste is applied to the negative-electrode current collector 16. Then, the layer-like paste is dried and pressed, thereby forming the negative-electrode active material layer 8. A solvent used to prepare the paste is, for example, water, dimethylformamide, N-methylpyrrolidone, isopropanol, or toluene.

The separator 11 is in the form of a film and is disposed between the positive electrode 2 and the negative electrode 7. The separator 11 together with the positive electrode 2 and the negative electrode 7 may form the electrode assembly 10 as shown in FIG. 5. The separator 11 is capable of preventing a short-circuit current from flowing between the positive electrode 2 and the negative electrode 7.

The separator 11 is not particularly limited as long as the separator is capable of preventing the short-circuit current from flowing, and as long as the separator is capable of allowing the ions, which are transmitted between the positive electrode and the negative electrode, to pass through the separator; and examples of the separator include a microporous film made of polyolefin, a cellulose film, and an aramid film. The separator 11 may be a non-woven fabric containing at least one of a cellulose fiber, a polyester fiber, a polypropylene fiber, a polyacrylonitrile fiber, and a polyethylene terephthalate fiber.

The electrode assembly 10 may have a structure in which a plurality of positive electrodes 2 and a plurality of negative electrodes 7 are alternately layered. The electrode assembly 10 may have a structure in which the separator 11 is interposed between the positive electrode 2 and the negative electrode 7 adjacent to each other.

The ionic liquid electrolyte 6 serves as an ion conduction medium between the positive electrode and the negative electrode. The ionic liquid electrolyte 6 includes as follows: the ionic liquid comprising the anion and the cation; and the lithium salt dissolved in the ionic liquid.

The ionic liquid comprises the anion and the cation. In general, ionic liquids are low in vapor pressure and are not flammable; therefore, the ionic liquid electrolyte 6 makes it possible to improve safety of the lithium-ion cell 50.

The ionic liquid contained in the ionic liquid electrolyte 6 comprises bis(fluorosulfonyl)imide ion (hereinafter referred to as the FSI ion) as the anion and a pyrrolidinium-based ion as the cation. More specifically, the ionic liquid comprises the FSI ion and methylpropyl pyrrolidinium ion (hereinafter referred to as the MPP ion). Such an ionic liquid allows the ionic liquid electrolyte 6 to be low in viscosity. In the case where the negative-electrode active material contains a carbon-based material such as the soft carbon or the hard carbon, the lithium ions can be intercalated into or deintercalated from the negative-electrode active material at the time of the charge and discharge.

The ionic liquid contained in the ionic liquid electrolyte 6 comprises, for example, the FSI ion as the anion and an imidazolium-based ion as the cation. More specifically, the ionic liquid comprises the FSI ion and ethylmethyl imidazolium ion (hereinafter referred to as the EMI ion). Such an ionic liquid allows the ionic liquid electrolyte 6 to be low in viscosity. In the case where the negative-electrode active material contains a carbon-based material such as the soft carbon or the hard carbon, the lithium ions can be intercalated into or deintercalated from the negative-electrode active material at the time of the charge and discharge.

The lithium salt contained in the ionic liquid electrolyte 6 (the lithium salt dissolved in the ionic liquid) is lithium bis(fluorosulfonyl)imide (hereinafter referred to as LiFSI) or lithium bis(trifluoromethansulfonyl)imide (hereinafter referred to as LiTFSI). Such a lithium salt can be dissolved in the ionic liquid at a relatively high concentration.

The ionic liquid electrolyte 6 contains the lithium salt at the concentration from 1.6 mol/L to 3.2 mol/L inclusive. The ionic liquid electrolyte 6 may contain the lithium salt at a concentration from 1.6 mol/L to 3.0 mol/L inclusive.

The ionic liquid electrolyte 6 seems to become saturated at a lithium salt concentration of 3.2 mol/L.

The lithium salt concentration of 1.6 mol/L or higher allows for high ionic conductivity of the ionic liquid electrolyte 6, and allows for improvement in the charge-discharge characteristics of the lithium-ion cell 50.

The lithium salt concentration of 1.6 mol/L or higher also allows the lithium-ion cell 50 to have excellent cycle characteristics. This became clear from experiments conducted by the inventors of the present invention.

The lithium salt concentration of 1.6 mol/L or higher can inhibit the ionic liquid from reacting with the lithium salt at temperatures of 100° C. or lower, and thus can inhibit the ionic liquid electrolyte 6 from denaturing. Therefore, the temperature of the ionic liquid electrolyte 6 can be raised to 100° C. or lower during a process for preparing the lithium-ion cell 50.

In the following, the step included in the process for preparing the lithium-ion cell 50 will be described—namely, the step of impregnating the positive-electrode active material layer 3 or the negative-electrode active material layer 8 with the ionic liquid electrolyte 6 (hereinafter referred to as the impregnation step). In the impregnation step, the positive-electrode active material layer 3 or the negative-electrode active material layer 8 can be thoroughly and completely impregnated with the ionic liquid electrolyte 6, improving the charge-discharge characteristics of the lithium-ion cell 50.

In the impregnation step, the positive-electrode active material layer 3 or the negative-electrode active material layer 8 is impregnated with the ionic liquid electrolyte 6 at a temperature from 50° C. to 100° C. inclusive. This enables the ionic liquid electrolyte 6 to be low in viscosity and enables the positive-electrode active material layer 3 or the negative-electrode active material layer 8 to be thoroughly and completely impregnated with the ionic liquid electrolyte 6. The positive-electrode active material layer 3 or the negative-electrode active material layer 8 may be impregnated with the ionic liquid electrolyte 6 having the viscosity of 50 mPa·s or less.

The impregnation step may be carried out under reduced pressure. This allows air in the fine pores 5 of the positive-electrode active material layer 3 to be discharged therefrom and in the fine pores of the negative-electrode active material layer 8 to be discharged therefrom, and allows these fine pores to be filled with the ionic liquid electrolyte 6.

Figure 6:
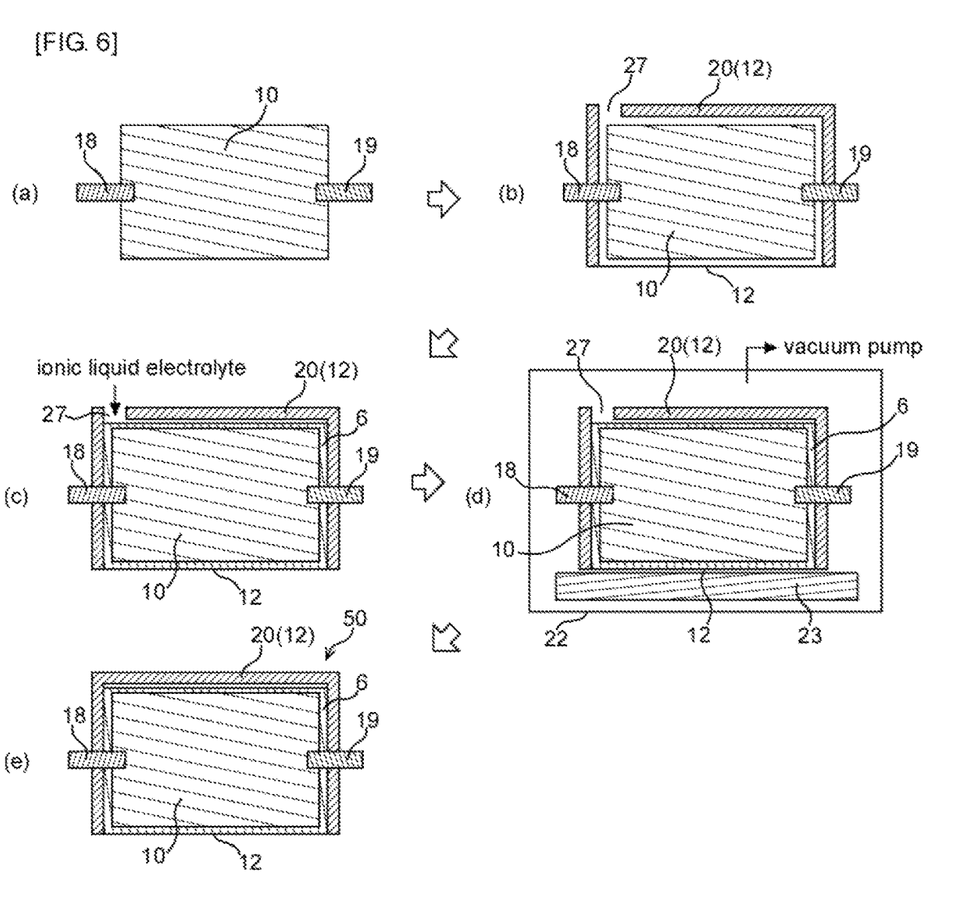
FIG. 6 shows explanatory diagrams of how to prepare a lithium-ion cell in accordance with one Embodiment of the present invention.

The impregnation step may be carried out inside a vacuum oven 22 in which the cell housing 12 accommodating the electrode assembly 10 and the ionic liquid electrolyte 6 is placed. For example, the impregnation step may be carried out as shown in FIGS. 6(a) to 6(e).

Figure 7:
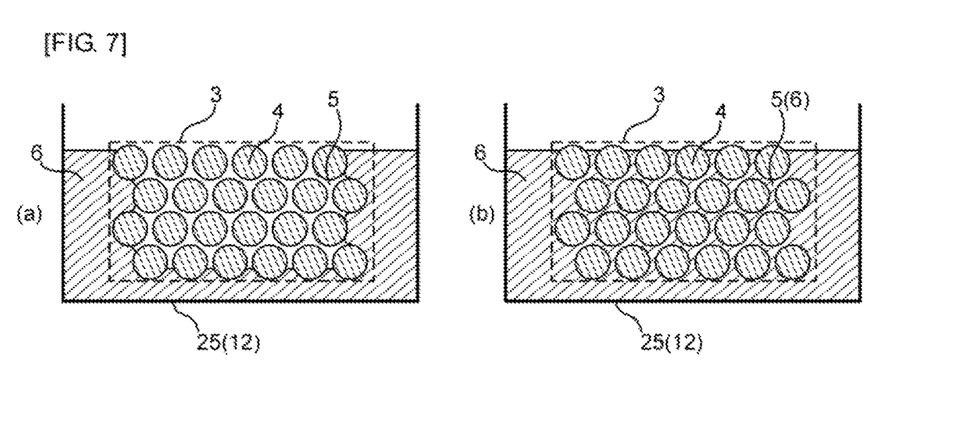
FIG. 7 shows explanatory diagrams of how to prepare a lithium-ion cell in accordance with one Embodiment of the present invention.

As illustrated in FIG. 6(a), the positive-electrode terminal 18 and the negative-electrode terminal 19 are attached to the electrode assembly 10 formed of the positive electrode 2, the negative electrode 7, and the separator 11 that are stacked. As illustrated in FIG. 6(b), the electrode assembly 10 is inserted into the cell housing 12; and as illustrated in FIG. 6(c), the ionic liquid electrolyte 6 is put into the cell housing 12 through an inlet 27. In that case, for example, the ionic liquid electrolyte 6 may be put into the cell housing in such a way that the top of the positive-electrode active material layer 3 and the top of the negative-electrode active material layer 8 are higher than the liquid level of the ionic liquid electrolyte 6, as shown in FIG. 7(a). FIG. 7 illustrates the positive-electrode active material layer 3; however, the same explanation can be applied to the negative-electrode active material layer 8.

Next, as illustrated in FIG. 6(d), the cell housing 12 with the inlet 27 open is placed in the vacuum oven 22; and while heating the inside of the vacuum oven 22 with a heater 23 so that the internal temperature of the vacuum oven 22 is between 50° C. and 100° C. inclusive, gas in the vacuum oven 22 is drawn out with a vacuum pump to degas gas in the fine pores of the positive-electrode active material layer 3 and gas in the fine pores of the negative-electrode active material layer 8. This makes it easier for the ionic liquid electrolyte 6 to enter the fine pores of the positive-electrode active material layer 3 and the fine pores of the negative-electrode active material layer 8.

Since the ionic liquid electrolyte 6 is heated up to the internal temperature of the vacuum oven 22, the viscosity of the ionic liquid electrolyte 6 is reduced; and the transfer resistance of the ionic liquid electrolyte 6 when the ionic liquid electrolyte moves through the fine pores of the positive-electrode active material layer 3 and the fine pores of the negative-electrode active material layer 8 is reduced. Therefore, the impregnation of the ionic liquid electrolyte 6 into the positive-electrode active material layer 3 and the negative-electrode active material layer 8 progresses; and the fine pores 5 of the positive-electrode active material layer 3 and the fine pores of the negative-electrode active material layer 8 are filled with the ionic liquid electrolyte 6, as shown in FIG. 7(b). Also, fine pores in the separator 11 are filled with the ionic liquid electrolyte 6.

The impregnation time in the vacuum oven 22 may be, for example, from 1 hour to 10 hours.

Next, as shown in FIG. 6(d), the cell housing 12 is taken out of the vacuum oven 22; and the inlet 27 is closed, completing the preparation of the lithium-ion cell 50.

The impregnation step can be performed by vacuum pumping the gas inside the cell housing 12 containing the electrode assembly 10 to degas the positive-electrode active material layer 3 and the negative-electrode active material layer 8, and then injecting the ionic liquid electrolyte 6 into the cell housing 12. The ionic liquid electrolyte 6, which is between 50° C. and 100° C. inclusive, may be injected into the cell housing 12.

Figure 8:
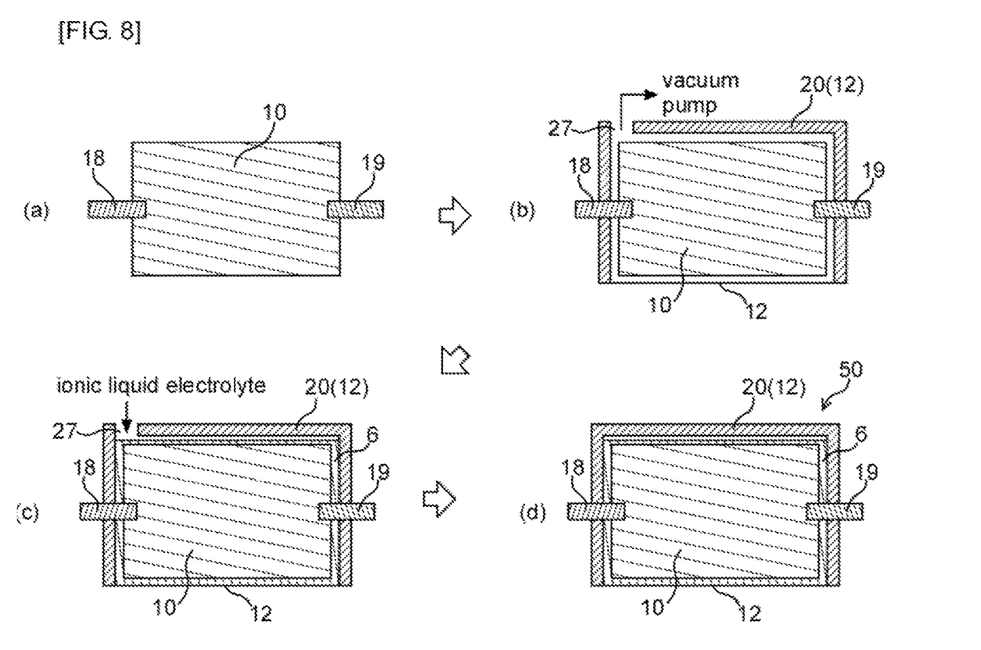
FIG. 8 shows explanatory diagrams of how to prepare a lithium-ion cell in accordance with one Embodiment of the present invention.

For example, the impregnation step can be performed as shown in FIGS. 8(a) to 8(d). As shown in FIG. 8(b), the gas in the fine pores of the positive-electrode active material layer 3 and the fine pores of the negative-electrode active material layer 8 can be surely removed by degassing the inside of the cell housing 12 with the vacuum pump before the ionic liquid electrolyte 6 is put into the cell housing 12. As shown in FIG. 8(c), by injecting the ionic liquid electrolyte 6 into the cell housing 12 that contains the positive-electrode active material layer 3 and the negative-electrode active material layer 8 from which the gas in the fine pores has been removed, the positive-electrode active material layer 3 and the negative-electrode active material layer 8 can be surely impregnated with the ionic liquid electrolyte 6. At this time, the ionic liquid electrolyte 6 having a temperature from 50° C. to 100° C. may be injected into the cell housing 12. After the inlet 27 is closed as shown in FIG. 8(*d*), the lithium-ion cell 50 may be placed in the oven adjusted to a temperature from 50° C. to 100° C. This allows the impregnation of the ionic liquid electrolyte 6 into the positive-electrode active material layer 3 and the negative-electrode active material layer 8 to progress.

The impregnation step can be performed before the electrode assembly 10 is placed in the cell housing 12. For example, the impregnation step can be performed as shown in FIGS. 9(*a*) to 9(*d*).

Figure 9:
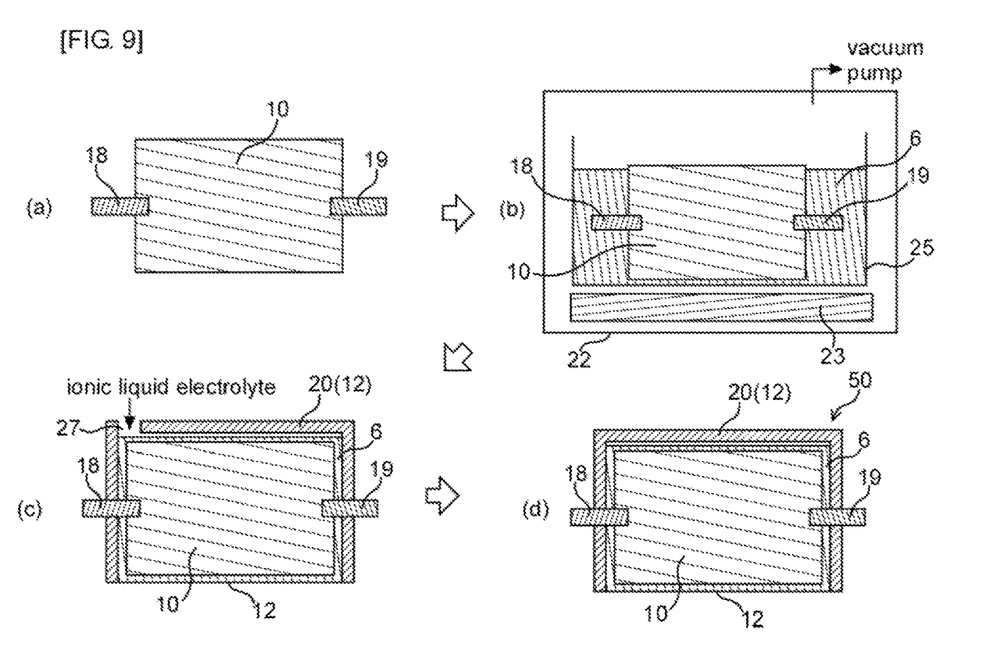
FIG. 9 shows explanatory diagrams of how to prepare a lithium-ion cell in accordance with one Embodiment of the present invention.

As shown in FIG. 9(*b*), a container 25 storing the electrode assembly 10 and the ionic liquid electrolyte 6 is placed in the vacuum oven 22; and while heating the inside of the vacuum oven 22 with the heater 23 so that the internal temperature of the vacuum oven 22 is from 50° C. to 100° C., the gas inside the vacuum oven 22 is sucked by the vacuum pump to degas the gas in the fine pores of the positive-electrode active material layer 3 and the gas in the fine pores of the negative-electrode active material layer 8. This progresses the impregnation of the ionic liquid electrolyte 6 into the positive-electrode active material layer 3 and the negative-electrode active material layer 8, and allows the fine pores 5 of the positive-electrode active material layer 3 and the fine pores of the negative-electrode active material layer 8 to be filled with the ionic liquid electrolyte 6. The impregnation time in the vacuum oven 22 may be, for example, from 1 hour to 10 hours. Next, as shown in FIG. 9(*c*), the electrode assembly 10, which has been removed from the container 25, and the ionic liquid electrolyte 6 are placed in the cell housing 12; and the inlet 27 is closed, completing the preparation of the lithium-ion cell 50 as shown in FIG. 9(*d*).

Charge-Discharge Experiments

Cells 1 to 31 described in Tables 1 and 2 were prepared and subjected to a charge-discharge experiment.

A positive electrode was prepared by coating a paste of a positive-electrode active material on one side of an aluminum foil (positive-electrode current collector) and drying it. A size of a positive-electrode active material layer was 90.5 mm×51.5 mm and 39 μm thick. Lithium iron phosphate (LiFePO$_4$) was used as the positive-electrode active material in all Cells 1 to 31, and the positive electrode was prepared in the same way.

A negative electrode was prepared by coating a paste of a negative-electrode active material on one side of a copper foil (negative-electrode current collector) and drying it. A size of a negative-electrode active material layer was 93.5 mm×55 mm and 45 μm thick. Soft carbon (SC) was used as the negative-electrode active material in Cells 1 to 28; and lithium titanate (LTO) was used as the negative-electrode active material in Cells 29 and 30; and hard carbon (HC) was used as the negative-electrode active material in Cell 31.

An electrode assembly is prepared by stacking one positive electrode prepared, separators (non-woven fabric) prepared, and one negative electrode prepared in this order so that the positive-electrode active material layer and the negative-electrode active material layer face each other; and the electrode assembly prepared and an ionic liquid electrolyte were placed in a case made of a laminate film. For the ionic liquid electrolyte, lithium salt dissolved in ionic liquid was used.

For Cells 1 to 16, 26, and 29 to 31, the ionic liquid containing MPP and FSI ions was used; for Cells 17 to 25, the ionic liquid containing EMI and FSI ions was used; for Cell 27, the ionic liquid containing EMI and TFS ions was used; and for Cell 28, the ionic liquid containing MPP and TFSI ions was used.

For Cells 1 to 25 and 29 to 31, LiFSI was used as the lithium salt; and for Cells 26 to 28, LiTFSI was used as the lithium salt. The concentration of the lithium salt was 0.8 M to 3.2 M. The details are shown in Tables 1 and 2.

Next, the impregnation step was carried out to impregnate the positive-electrode active material layer and the negative-electrode active material layer with the ionic liquid electrolyte. For Cells 1, 8, 17, and 20, the impregnation step was carried out at ordinary temperatures and ordinary pressures, while for the other Cells, vacuum impregnation was carried out. The vacuum impregnation was carried out using a vacuum oven, as illustrated in FIG. 6(*d*). The time and temperature of the vacuum impregnation for each Cell are shown in Tables 1 and 2. Gas in the vacuum oven was suctioned using a vacuum pump with ultimate vacuum of $6.7 \times 10^{-2}$ Pa.

Then Cells 1 to 31 were prepared by hermetically sealing the case so that the inside of the case become an enclosed space.

Initial charge and discharge was carried out using Cells 1 to 31 prepared. For the initial charge and discharge, the first and second charge and discharge were carried out at 0.1 C (3.75 mA); and the third charge and discharge was carried out at 1.0 C (37.5 mA) (charge: CCCV; discharge: CC).

Then, a cycle test for the charge and discharge was repeated (charge-discharge current: 1.0 C; charge: CCCV; discharge: CC; number of cycles: 100 times).

Discharge capacities of the Cells each, which are calculated from measurement results of the initial charge and discharge and the cycle tests, are shown in Tables 1 and 2. For Cells 3, 6, and 15, the cycle test was not conducted; and for Cells 5, 7, 16, 21, and 27 to 31, the cycle test was not conducted until the 100th cycle.

Figure 10:
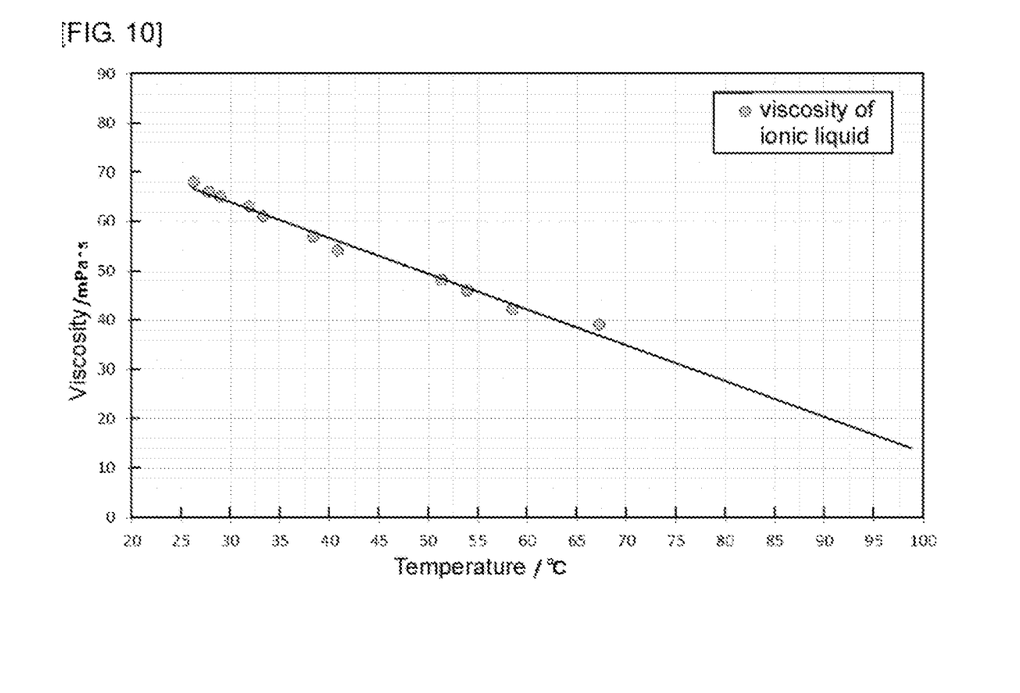
FIG. 10 is a graph showing temperature dependence of viscosity of an ionic liquid.
Figure 11:
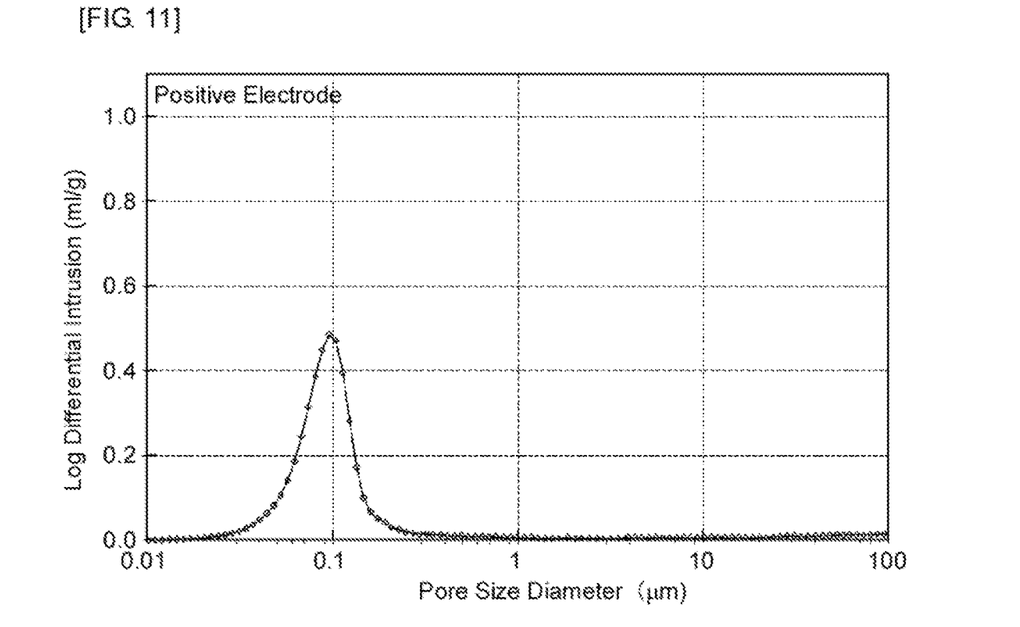
FIG. 11 is a graph showing a pore distribution in a positive-electrode active material layer.
Figure 12:
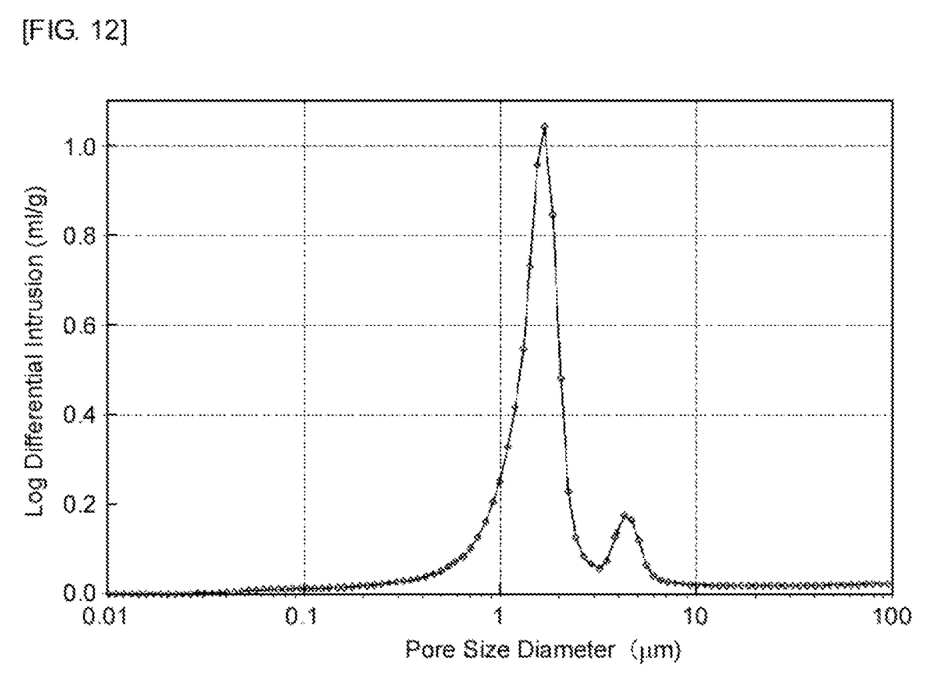
FIG. 12 is a graph showing a pore distribution in a negative-electrode active material layer.

FIG. 10 shows temperature dependence of viscosity of the ionic liquid; FIG. 11 shows a pore distribution in the positive-electrode active material layer; and FIG. 12 shows a pore distribution in the negative-electrode active material layer (soft carbon).

TABLE 1

| | Ionic liquid electrolyte | | | Impregnation conditions | Discharge capacity at initial charge and discharge (0.1 C) | Discharge capacity in 1st cycle | Discharge capacity in 100th cycle |
|---|---|---|---|---|---|---|---|
| | Cation | Anion | Lithium salt | | | | |
| Cell 1 | MPP | FSI | 0.8M LiFSI | ordinary temperature and pressure | 20.7 mAh | 8.5 mAh | 3.4 mAh |

TABLE 1-continued

| | Ionic liquid electrolyte | | | Impregnation conditions | Discharge capacity at initial charge and discharge (0.1 C) | Discharge capacity in 1st cycle | Discharge capacity in 100th cycle |
|---|---|---|---|---|---|---|---|
| | Cation | Anion | Lithium salt | | | | |
| Cell 2 | MPP | FSI | 0.8M LiFSI | 60° C., 3 hr vacuum impregnation | 29.9 mAh | 15.5 mAh | 4.7 mAh |
| Cell 3 | MPP | FSI | 0.8M LiFSI | 80° C., 3 hr vacuum impregnation | 37.6 mAh | | |
| Cell 4 | MPP | FSI | 0.8M LiFSI | 100° C., 3 hr vacuum impregnation | 35.7 mAh | 23.9 mAh | 4.6 mAh |
| Cell 5 | MPP | FSI | 1.6M LiFSI | 60° C., 3 hr vacuum impregnation | 32.3 mAh | 27.6 mAh | |
| Cell 6 | MPP | FSI | 1.6M LiFSI | 80° C., 3 hr vacuum impregnation | 35.9 mAh | | |
| Cell 7 | MPP | FSI | 1.6M LiFSI | 100° C., 3 hr vacuum impregnation | 35.0 mAh | 26.8 mAh | |
| Cell 8 | MPP | FSI | 2.4M LiFSI | ordinary temperature and pressure | 24.5 mAh | 24.1 mAh | 25.4 mAh |
| Cell 9 | MPP | FSI | 2.4M LiFSI | 40° C., 3 hr vacuum impregnation | 23.8 mAh | 18.6 mAh | 21.2 mAh |
| Cell 10 | MPP | FSI | 2.4M LiFSI | 50° C., 3 hr vacuum impregnation | 34.8 mAh | 30.6 mAh | 29.9 mAh |
| Cell 11 | MPP | FSI | 2.4M LiFSI | 60° C., 3 hr vacuum impregnation | 34.6 mAh | 31.2 mAh | 31.6 mAh |
| Cell 12 | MPP | FSI | 2.4M LiFSI | 70° C., 3 hr vacuum impregnation | 40.5 mAh | 36.2 mAh | 33.1 mAh |
| Cell 13 | MPP | FSI | 2.4M LiFSI | 80° C., 3 hr vacuum impregnation | 39.2 mAh | 34.3 mAh | 31.7 mAh |
| Cell 14 | MPP | FSI | 2.4M LiFSI | 100° C., 3 hr vacuum impregnation | 37.5 mAh | 32.6 mAh | 25.0 mAh |
| Cell 15 | MPP | FSI | 3M LiFSI | 80° C., 3 hr vacuum impregnation | 33.0 mAh | | |
| Cell 16 | MPP | FSI | 3.2M LiFSI | 100° C., 3 hr vacuum impregnation | 35.1 mAh | 28.8 mAh | |
| Cell 17 | EMI | FSI | 0.8M LiFSI | ordinary temperature and pressure | 12.4 mAh | 8.2 mAh | 4.6 mAh |
| Cell 18 | EMI | FSI | 0.8M LiFSI | 60° C., 3 hr vacuum impregnation | 13.8 mAh | 8.6 mAh | 5.4 mAh |
| Cell 19 | EMI | FSI | 0.8M LiFSI | 100° C., 3 hr vacuum impregnation | 29.6 mAh | 22.3 mAh | 13.1 mAh |
| Cell 20 | EMI | FSI | 2.4M LiFSI | ordinary temperature and pressure | 25.1 mAh | 16.1 mAh | 16.4 mAh |
| Cell 21 | EMI | FSI | 2.4M LiFSI | 60° C., 3 hr vacuum impregnation | 25.0 mAh | 16.4 mAh | |
| Cell 22 | EMI | FSI | 2.4M LiFSI | 70° C., 3 hr vacuum impregnation | 39.2 mAh | 34.6 mAh | 26.4 mAh |
| Cell 23 | EMI | FSI | 2.4M LiFSI | 80° C., 3 hr vacuum impregnation | 40.0 mAh | 36.2 mAh | 31.7 mAh |
| Cell 24 | EMI | FSI | 2.4M LiFSI | 90° C., 3 hr vacuum impregnation | 40.1 mAh | 36.2 mAh | 31.9 mAh |
| Cell 25 | EMI | FSI | 2.4M LiFSI | 100° C., 3 hr vacuum impregnation | 40.6 mAh | 36.3 mAh | 30.2 mAh |
| Cell 26 | MPP | FSI | 1.6M LiTFSI | 80° C., 3 hr vacuum impregnation | 32.1 mAh | 15.3 mAh | 19.7 mAh |
| Cell 27 | EMI | TFSI | 1.6M LiTFSI | 80° C., 3 hr vacuum impregnation | 2.1 mAh | 0.01 mAh | |
| Cell 28 | MPP | TFSI | 1.6M LiTFSI | 8° C., 3 hr vacuum impregnation | 5.9 mAh | 1.8 mAh | |

TABLE 2

| | Ionic liquid electrolyte | | | Positive electrode | Negative electrode | Impregnation conditions | 0.1 C Discharge capacity at initial charge and discharge | 1 C Discharge capacity in 1st cycle |
|---|---|---|---|---|---|---|---|---|
| | Cation | Anion | Lithium salt | | | | | |
| Cell 29 | MPP | FSI | 0.8M LiFSI | LFP | LTO | 100° C., 3 hr vacuum impregnation | 46.9 mAh | 6.1 mAh |
| Cell 30 | MPP | FSI | 2.4M LiFSI | LFP | LTO | 100° C., 3 hr vacuum impregnation | 43.4 mAh | 41.2 mAh |
| Cell 31 | MPP | FSI | 2.4M LiFSI | LFP | HC | 100° C., 3 hr vacuum impregnation | 52.6 mAh | 47.4 mAh |

For Cells 1 to 4, the ionic liquid was MPP-FSI; the lithium salt was 0.8 M LiFSI; and the impregnation condition was set at ordinary temperatures to 100° C. Cell 1, in which the impregnation conditions were ordinary temperatures and pressures, had a discharge capacity of 20.7 mAh at the time of the initial charge and discharge, while Cells 2 to 4, in which the vacuum impregnation was carried out at temperatures of 60° C. or higher, had discharge capacities from 29.9 mAh to 37.6 mAh, which were larger than the discharge capacity of Cell 1.

As shown in FIG. 10, the ionic liquids have high viscosity at room temperature; and the viscosity decreases as the temperature increases. Therefore, in Cell 1 in which the positive-electrode active material layer and the negative-electrode active material layer were impregnated with the ionic liquid electrolyte at the ordinary temperature and pressure, it is considered that fine pores of 10 μm or less were not sufficiently filled with the ionic liquid electrolyte, as shown in FIGS. 11 and 12, because the viscosity of the ionic liquid electrolyte was relatively high, and no vacuum was applied. Therefore, it is thought that there are some parts in the positive-electrode active material layer or the negative-electrode active material layer that are not impregnated with the ionic liquid electrolyte.

In Cells 2 to 4 for which the impregnation step was performed in the vacuum oven at 60° C. or higher, the viscosity of the ionic liquid electrolyte was relatively low, and the vacuum was applied; therefore, the fine pores of 10 μm or less were impregnated with the ionic liquid electrolyte, as shown in FIGS. 11 and 12. It is thought that the positive-electrode active material layer and the negative-electrode active material layer are thoroughly and completely impregnated with the ionic liquid electrolyte. As a result, it is thought that the discharge capacities of Cells 2 to 4 became larger than the discharge capacity of Cell 1.

A first reference cell was also prepared using a non-aqueous electrolytic solution (non-aqueous solvent: EC/DEC/EMC=27.5/5/67.5 (additives: 0.7% VC, 0.3% FEC), lithium salt: 0.2 mol/L LiPF$_6$) instead of the ionic liquid electrolyte. The preparation method, the experimental method, and the compositions except for the electrolytic solution are the same as Cell 1. The first reference cell had a discharge capacity of 37.8 mAh at a time of an initial charge and discharge (0.1 C), a discharge capacity of 33.7 mAh in the 1st cycle, and a discharge capacity of 32.4 mAh in the 100th cycle.

The findings from comparisons between Cells 1 to 4 and the first reference cell were as follows: The discharge capacity of Cell 1 at the time of the initial charge and discharge was about 50% of the discharge capacity of the first reference cell; the discharge capacity of Cell 2 at the time of the initial charge and discharge was about 80% of the discharge capacity of the first reference cell; and the discharge capacities of Cells 3 and 4 at the time of the initial charge and discharge were almost the same as the discharge capacity of the first reference cell.

During the cycle tests on Cells 1, 2, and 4, the more the cycles were conducted, the lower the discharge capacities became; and the discharge capacity became 5 mAh or lower in the 100th cycle. It was found that Cells 1, 2, and 4 were poor in cycle characteristics.

For Cells 5 to 7, the ionic liquid was MPP-FSI; the lithium salt was 1.6 M LiFSI; and the impregnation condition was the vacuum impregnation at 60° C. to 100° C. These Cells had discharge capacities of 30 mAh or higher in the initial charge and discharge, and had the sufficiently large discharge capacities. It was thus deemed that the positive-electrode active material layers and the negative-electrode active material layers of Cells 5 to 7 were sufficiently impregnated with the ionic liquid electrolyte.

For Cells 8 to 14, the ionic liquid was MPP-FSI; the lithium salt was 2.4 M LiFSI; and the impregnation condition was set at ordinary temperatures to 100° C.

Cell 8, in which the impregnation conditions were ordinary temperatures and pressures, and Cell 9, in which the vacuum impregnation was carried out at a temperature of 40° C. as the impregnation condition, had discharge capacities of 25 mAh or lower at the time of the initial charge and discharge, while Cells 10 to 14, in which the vacuum impregnation was carried out at temperatures of 50° C. or higher, had discharge capacities of 34 mAh or higher at the time of the initial charge and discharge, which were larger than the discharge capacities of Cells 8 and 9. It is thus thought that the positive-electrode active material layers and the negative-electrode active material layers of Cells 10 to 14 were sufficiently impregnated with the ionic liquid electrolyte. Therefore, it was found that the vacuum impregnation carried out at the temperatures of 50° or higher was able to allow the positive-electrode active material layers and the negative-electrode active material layers to be sufficiently impregnated with the ionic liquid electrolyte.

During the cycle tests on Cells 8 to 14, unlike the cycle tests on Cells 1, 2, and 4, the discharge capacities did not drop considerably. Therefore, it was found that Cells 8 to 14, in which the concentration of the lithium salt was 2.4 M, and the temperatures during the vacuum impregnation were 100° C. or lower, were excellent in cycle characteristics.

For Cell 15, the ionic liquid was MPP-FSI; the lithium salt was 3M LiFSI; and the impregnation condition was set to become 80° C. For Cell 16, the ionic liquid was MPP-FSI; the lithium salt was 3.2 M LiFSI; and the impregnation condition was set to become 100° C. These Cells had discharge capacities of 33 mAh or larger in the initial charge and discharge, and had the sufficiently large discharge capacities. Therefore, it was found that even though the concentration of the lithium salt was set at 3 M or higher, the discharge capacity was not reduced. It was, however, observed from Cell 16 that the lithium salt was precipitated from the ionic liquid electrolyte at room temperature.

For Cells 17 to 19, the ionic liquid was EMI-FSI; the lithium salt was 0.8 M LiFSI; and the impregnation condition was set at ordinary temperatures to 100° C. Cell 17, in which the impregnation conditions were ordinary temperatures and pressures, and Cell 18, in which the vacuum impregnation was carried out at 60° C. as the impregnation condition, had discharge capacities of 14 mAh or lower in the initial charge and discharge, while Cell 19, in which the vacuum impregnation was carried out at 100° C., had a discharge capacity of 29.6 mAh in the initial charge and discharge, which was larger than the discharge capacities of Cells 17 and 18. It is thus thought that the positive-electrode active material layer and the negative-electrode active material layer of Cell 19 were sufficiently impregnated with the ionic liquid electrolyte. Also, it was found that EMI-FSI used as the ionic liquid of the ionic liquid electrolyte was able to allow the cell to have the large discharge capacity.

During the cycle tests on Cells 17 to 19, the more the cycles were conducted, the lower the discharge capacities became. Therefore, it was found that Cells 17 to 19 were poor in cycle characteristics.

For Cells 1, 2, 4, and 17 to 19, the concentration of the lithium salt was set at 0.8 M, implying that the decrease in the cycle characteristics was caused by the lithium salt concentration.

For Cells 20 to 25, the ionic liquid was EMI-FSI; the lithium salt was 2.4 M LiFSI; and the impregnation condition was set at ordinary temperatures to 100° C. Cell 20, in which the impregnation conditions were ordinary temperatures and pressures, and Cell 21, in which the vacuum impregnation was carried out at 60° C. as the impregnation condition, had discharge capacities of about 25 mAh or lower in the initial charge and discharge, while Cells 22 to 25, in which the vacuum impregnation was carried out at temperatures of 70° C. or higher, had discharge capacities of 39 mAh or higher in the initial charge and discharge, which were larger than the discharge capacities of Cells 20 and 21. It is thus thought that the positive-electrode active material layers and the negative-electrode active material layers of Cells 22 to 25 were sufficiently impregnated with the ionic liquid electrolyte.

During the cycle tests on Cells 20 and 22 to 25, unlike the cycle tests on Cells 17 to 19, the discharge capacities did not drop considerably. Therefore, it was found that Cells 20 and 22 to 25, in which the concentration of the lithium salt was 2.4 M, were excellent in cycle characteristics.

For Cell 26, the ionic liquid was MPP-FSI; the lithium salt was 1.6 M LiTFSI; and the impregnation condition was set to become 80° C. This Cell had a discharge capacity of 32.1 mAh or larger in the initial charge and discharge, and had the sufficiently large discharge capacity. During the cycle test on this Cell, the discharge capacity did not drop considerably. Therefore, it was found that even though LiTFSI was used as the lithium salt, this Cell had the excellent cycle characteristics.

For Cell 27, the ionic liquid was EMI-TFSI; the lithium salt was 1.6 M LiTFSI; and the impregnation condition was set to become 80° C. For Cell 28, the ionic liquid was MPP-TFSI; the lithium salt was 1.6 M LiTFSI; and the impregnation condition was set to become 80° C. These Cells had the low discharge capacities of 6 mAh or lower. Therefore, it was found that the ionic liquid in which the anion is the TFSI ion caused the decrease in the charge-discharge characteristics.

For Cells 29 and 30, lithium titanate (LTO) was used as the negative-electrode active material. Also, for Cells 29 and 30, the ionic liquid was MPP-FSI; the lithium salt was 0.8 M or 2.4 M LiFSI; and the impregnation condition was set to become 100° C. Cells 29 and 30 had discharge capacities of 43 mAh or higher in the initial charge and discharge, and had the large discharge capacities. Cell 29, in which the concentration of the lithium salt was 0.8 M during the cycle test, significantly dropped the discharge capacity, while Cell 30, in which the concentration of the lithium salt was 2.4 M, did not have such a decrease in the discharge capacity. Therefore, it was found that the Cells using LTO as the negative-electrode active material had the similar tendency to the Cells using the soft carbon (SC) as the negative-electrode active material.

A second reference cell was also prepared using a non-aqueous electrolytic solution (non-aqueous solvent: EC/DEC/EMC=27.5/5/67.5 (additives: 0.7% VC, 0.3% FEC), lithium salt: 1.2 mol/L LiPF$_6$) instead of the ionic liquid electrolyte. The experimental method and the compositions except for the electrolytic solution are the same as Cells 29 and 30. (The impregnation step was carried out at ordinary temperatures and pressures.) The second reference cell had a discharge capacity of 44.3 mAh at a time of an initial charge and discharge (0.1 C) and a discharge capacity of 39.6 mAh in the 1st cycle. It was thus found that Cell 30 had the similar charge-discharge characteristics to the second reference cell.

In Cell 31, the hard carbon (HC) was used as the negative-electrode active material. Also, for Cell 31, the ionic liquid was MPP-FSI; the lithium salt was 2.4 M LiFSI; and the impregnation condition was set at 100° C. Cell 31 had a discharge capacity of 52.6 mAh in an initial charge and discharge and a discharge capacity of 47.4 mAh in the 1st cycle of the cycle test. It was thus found that the Cell using the HC as the negative-electrode active material was excellent in charge-discharge characteristics.

A third reference cell was also prepared using a non-aqueous electrolytic solution (non-aqueous solvent: EC/DEC/EMC=27.5/5/67.5 (additives: 0.7% VC, 0.3% FEC) lithium salt: 1.2 mol/L LiPF$_6$) instead of the ionic liquid electrolyte. The experimental method and the compositions except for the electrolytic solution are the same as Cell 31. (The impregnation step was carried out at ordinary temperatures and pressures.) The third reference cell had a discharge capacity of 51.9 mAh in an initial charge and discharge (0.1 C) and a discharge capacity of 49.2 mAh in the 1st cycle. It was thus found that Cell 31 had the similar charge-discharge characteristics to the third reference cell.

DSC Measurement Experiments

By using a differential scanning calorimeter (DSC), thermophysical measurement was performed on ionic liquids and ionic liquid electrolytes. Samples used are as follows:
(a) MPP-FSI (pure MPP-FSI) to which any lithium salt is not added.
(b) MPP-FSI in which 0.8 M of LiFSI is dissolved.
(c) MPP-FSI in which 1.2 M of LiFSI is dissolved.
(d) MPP-FSI in which 1.6 M of LiFSI is dissolved.
(e) MPP-FSI in which 2.4 M of LiFSI is dissolved.
(f) MPP-FSI in which 3.0 M of LiFSI is dissolved.

Used as an atmosphere gas was an argon gas, and a rate of temperature increase was 2° C./min.

Figure 13:
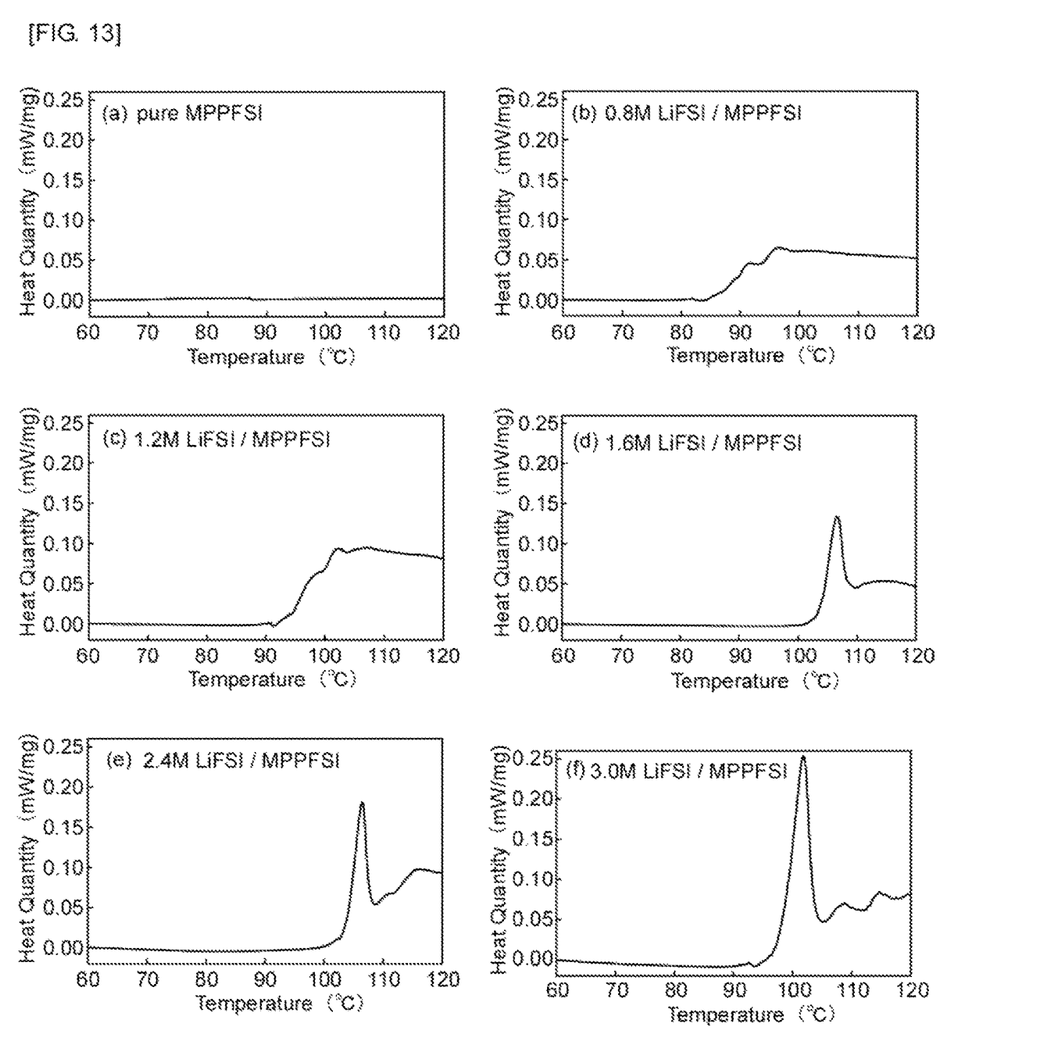
FIG. 13 shows graphs showing measurement results of a DSC measurement.

Measurement results are shown in FIG. 13. A DSC curve of the pure MPP-FSI shown in FIG. 13(a) did not almost vary in heat flow associated with endothermic heat and exothermic heat of the sample, while DSC curves of the LiFSI-added MPP-FSI shown in FIGS. 13(b) to 13(f) varied in heat flow associated with endothermic heat and exothermic heat of the samples. It is considered that these variations are caused by exothermic reaction or endothermic reaction between the LiFSI and the MPP-FSI.

It was observed that the LiFSI-added MPP-FSI used in the measurements shown in FIGS. 13(b) to 13(f) were a pale yellow, nearly transparent liquid before the DSC measurement, but became more yellow after the DSC measurement.

The DSC curve of the 0.8 M LiFSI/MPP-FSI shown in FIG. 13(b) had a peak within a range from 85° C. to 100° C.; however, the DSC curve of the 1.6 M LiFSI/MPP-FSI shown in FIG. 13(d) and the DSC curve of the 2.4 M LiFSI/MPP-FSI shown in FIG. 13(e) did not have any peak within a range of 100° C. and lower. This suggests that the LiFSI and the MPP-FSI in the 0.8 M LiFSI/MPP-FSI are more reactive because the 0.8 M LiFSI/MPP-FSI is lower in thermal stability than the 1.6 M LiFSI/MPP-FSI and the 2.4 M LiFSI/MPP-FSI. This also suggests that such low thermal stability causes the lithium-ion cells (Cells 1, 2, 4, and 17 to 19) using the 0.8 M LiFSI/MPP-FSI to decrease in cycle characteristics.

The DSC curve of the 3.0 M LiFSI/MPP-FSI shown in FIG. 13(f) has a peak in the vicinity of 100° C. It was found from this result that the 3.0 M LiFSI/MPP-FSI was higher in thermal stability than the 0.8 M LiFSI/MPP-FSI; and it was suggested that such a concentration of the ionic liquid electrolyte was capable of preparing the stable cells.

REFERENCE SIGNS LIST

2: positive electrode
3: positive-electrode active material layer
4: positive-electrode active material
5: fine pore
6: ionic liquid electrolyte
7: negative electrode
8: negative-electrode active material layer
9: negative-electrode active material
10: electrode assembly
11: separator
12: cell housing
15: positive-electrode current collector
16: negative-electrode current collector
18: positive-electrode terminal
19: negative-electrode terminal
20: fusion bonding section
22: vacuum oven
23: heater
25: container
27: inlet
50: lithium-ion cell

What is claimed is:

1. A method for manufacturing a lithium-ion cell, the method comprising a step of impregnating a porous positive-electrode active material layer or a porous negative-electrode active material layer with an ionic liquid electrolyte, wherein
the ionic liquid electrolyte includes: an ionic liquid comprising an anion and a cation; and a lithium salt dissolved in the ionic liquid;
the anion is bis (fluorosulfonyl) imide ion;
the lithium salt is lithium bis (fluorosulfonyl) imide or lithium bis (trifluoromethansulfonyl) imide;
the ionic liquid electrolyte contains the lithium salt at a concentration of 1.6 mol/L to 3.2 mol/L inclusive; and
the step of impregnation with the ionic liquid electrolyte is the step of impregnating the porous positive-electrode active material layer or the porous negative-electrode active material layer with the ionic liquid electrolyte at a temperature of 50° C. to 100° C. inclusive; and
the step of impregnation with the ionic liquid electrolyte is the step of impregnating the porous positive-electrode active material layer or the porous negative-electrode active material layer with the ionic liquid electrolyte having a viscosity of 50 mPa's or less.

2. The manufacturing method according to claim 1, wherein the step of impregnation with the ionic liquid electrolyte is carried out under reduced pressure.

3. The manufacturing method according to claim 1, wherein the step of impregnation with the ionic liquid electrolyte is the step of impregnating the porous positive-electrode active material layer or the porous negative-electrode active material layer with the ionic liquid electrolyte without denaturing the ionic liquid electrolyte.

4. The manufacturing method according to claim 1, wherein the cation is pyrrolidinium-based ion or imidazolium-based ion.

5. The manufacturing method according to claim 4, wherein the cation is methylpropyl pyrrolidinium ion or ethylmethyl imidazolium ion.

6. A method for manufacturing a lithium-ion cell, the method comprising a step of impregnating a porous positive-electrode active material layer or a porous negative-electrode active material layer with an ionic liquid electrolyte, wherein
the ionic liquid electrolyte includes: an ionic liquid comprising an anion and a cation; and a lithium salt dissolved in the ionic liquid;
the anion is bis (fluorosulfonyl) imide ion;
the lithium salt is lithium bis (fluorosulfonyl) imide or lithium bis (trifluoromethansulfonyl) imide;
the ionic liquid electrolyte contains the lithium salt at a concentration of 1.6 mol/L to 3.2 mol/L inclusive; and
the step of impregnation with the ionic liquid electrolyte is the step of impregnating the porous positive-electrode active material layer or the porous negative-electrode active material layer with the ionic liquid electrolyte at a temperature of 50° C. to 100° C. inclusive; and
a logarithm differential pore volume distribution curve has a peak within a range of 0.6 μm or less of a pore diameter, the logarithm differential pore volume distribution curve showing a relationship between the pore diameter and a pore volume of pores in the porous positive-electrode active material layer or in the porous negative-electrode active material layer.

7. The manufacturing method according to claim 1, wherein the step of impregnation with the ionic liquid electrolyte is carried out in a state where an electrode assembly is placed in a cell housing, the electrode assembly comprising: a positive electrode including the porous positive-electrode active material layer; a negative electrode including the porous negative-electrode active material layer; and a separator.

8. The manufacturing method according to claim 2, wherein the step of impregnation with the ionic liquid electrolyte is the step of impregnating the porous positive-electrode active material layer or the porous negative-electrode active material layer with the ionic liquid electrolyte without denaturing the ionic liquid electrolyte.

9. A method for manufacturing a lithium-ion cell, the method comprising a step of impregnating a porous positive-electrode active material layer or a porous negative-electrode active material layer with an ionic liquid electrolyte, wherein
the ionic liquid electrolyte includes: an ionic liquid comprising an anion and a cation; and a lithium salt dissolved in the ionic liquid;
the anion is bis (fluorosulfonyl) imide ion;
the lithium salt is lithium bis (fluorosulfonyl) imide or lithium bis (trifluoromethansulfonyl) imide;
the ionic liquid electrolyte contains the lithium salt at a concentration of 1.6 mol/L to 3.2 mol/L inclusive;
the step of impregnation with the ionic liquid electrolyte is the step of impregnating the porous positive-electrode active material layer or the porous negative-electrode active material layer with the ionic liquid electrolyte at a temperature of 50°° C. to 100° C. inclusive;
the step of impregnation with the ionic liquid electrolyte is the step of impregnating the porous positive-electrode active material layer or the porous negative-electrode active material layer with the ionic liquid electrolyte without denaturing the ionic liquid electrolyte; and
a logarithm differential pore volume distribution curve has a peak within a range of 0.6 μm or less of a pore diameter, the logarithm differential pore volume distribution curve showing a relationship between the pore diameter and a pore volume of pores in the porous positive-electrode active material layer or in the porous negative-electrode active material layer.

10. The manufacturing method according to claim 6, wherein the step of impregnation with the ionic liquid electrolyte is carried out in a state where an electrode assembly is placed in a cell housing, the electrode assembly comprising: a positive electrode including the porous positive-electrode active material layer; a negative electrode including the porous negative-electrode active material layer; and a separator.

11. The manufacturing method according to claim 9, wherein the step of impregnation with the ionic liquid electrolyte is carried out in a state where an electrode assembly is placed in a cell housing, the electrode assembly comprising: a positive electrode including the porous positive-electrode active material layer; a negative electrode including the porous negative-electrode active material layer; and a separator.

12. The manufacturing method according to claim 6, wherein the step of impregnation with the ionic liquid electrolyte is the step of impregnating the porous positive-electrode active material layer or the porous negative-electrode active material layer with the ionic liquid electrolyte having a viscosity of 50 mPa's or less.

13. The manufacturing method according to claim 9, wherein the step of impregnation with the ionic liquid electrolyte is the step of impregnating the porous positive-electrode active material layer or the porous negative-electrode active material layer with the ionic liquid electrolyte having a viscosity of 50 mPa's or less.

14. The manufacturing method according to claim 13, wherein the step of impregnation with the ionic liquid electrolyte is carried out under reduced pressure.

15. The manufacturing method according to claim 6, wherein the step of impregnation with the ionic liquid electrolyte is carried out under reduced pressure.

16. The manufacturing method according to claim 9, wherein the step of impregnation with the ionic liquid electrolyte is carried out under reduced pressure.

17. The manufacturing method according to claim 6, wherein the cation is pyrrolidinium-based ion or imidazolium-based ion.

18. The manufacturing method according to claim 17, wherein the cation is methylpropyl pyrrolidinium ion or ethylmethyl imidazolium ion.

19. The manufacturing method according to claim 9, wherein the cation is pyrrolidinium-based ion or imidazolium-based ion.

20. The manufacturing method according to claim 19, wherein the cation is methylpropyl pyrrolidinium ion or ethylmethyl imidazolium ion.

* * * * *

UNITED STATES PATENT AND TRADEMARK OFFICE
CERTIFICATE OF CORRECTION

PATENT NO. : 12,113,174 B2
APPLICATION NO. : 17/282148
DATED : October 8, 2024
INVENTOR(S) : Ryota Furuya and Tomitaro Hara It is certified that error appears in the above-identified patent and that said Letters Patent is hereby corrected as shown below:

In the Claims

Claim 1, Column 19, Line 37, replace "bis (fluorosulfonyl) imide" with "bis(fluorosulfonyl)imide"

Claim 1, Column 19, Line 38, replace "bis (fluorosulfonyl) imide" with "bis(fluorosulfonyl)imide"

Claim 1, Column 19, Line 39, replace "bis (trifluoromethansulfonyl) imide" with "bis (trifluoromethansulfonyl)imide"

Claim 1, Column 19, Line 52, replace "mPA's" with "mPa·s"

Claim 6, Column 20, Line 9, replace "bis (fluorosulfonyl) imide" with "bis(fluorosulfonyl)imide"

Claim 6, Column 20, Line 10, replace "bis (fluorosulfonyl) imide" with "bis(fluorosulfonyl)imide"

Claim 6, Column 20, Line 11, replace "bis (trifluoromethansulfonyl) imide" with "bis (trifluoromethansulfonyl)imide"

Claim 9, Column 20, Line 49, replace "bis (fluorosulfonyl) imide" with "bis(fluorosulfonyl)imide"

Claim 9, Column 20, Line 50, replace "bis (fluorosulfonyl) imide" with "bis(fluorosulfonyl)imide"

Claim 9, Column 20, Line 51, replace "bis (trifluoromethansulfonyl) imide" with "bis (trifluoromethansulfonyl)imide"

Claim 12, Column 21, Line 28, replace "mPA's" with "mPa·s"

Claim 13, Column 22, Line 6, replace "mPA's" with "mPa·s"

Signed and Sealed this
Twelfth Day of November, 2024

Katherine Kelly Vidal
*Director of the United States Patent and Trademark Office*